(12) United States Patent
Levy

(10) Patent No.: US 7,127,902 B1
(45) Date of Patent: Oct. 31, 2006

(54) COMPOSITION FOR LEAK STOPPER AND SEALER

(76) Inventor: Ahron Levy, 9633 NW. 45th St., Sunrise, FL (US) 33351

( * ) Notice: Subject to any disclaimer, the term of this patent is extended or adjusted under 35 U.S.C. 154(b) by 359 days.

(21) Appl. No.: 10/760,715

(22) Filed: Jan. 20, 2004

Related U.S. Application Data

(63) Continuation of application No. 10/065,649, filed on Nov. 6, 2002, now abandoned.

(60) Provisional application No. 60/337,841, filed on Nov. 8, 2001.

(51) Int. Cl.
*F25B 45/00* (2006.01)
*C09K 5/04* (2006.01)
*F16L 55/18* (2006.01)

(52) U.S. Cl. .............. 62/77; 62/114; 252/67; 138/97

(58) Field of Classification Search .......... 62/77, 62/114, 84, 149, 498, 174, 231; 138/97; 252/67
See application file for complete search history.

(56) References Cited

U.S. PATENT DOCUMENTS

| | | | |
|---|---|---|---|
| 4,487,707 A * | 12/1984 | Holzknecht | 252/68 |
| 5,650,563 A * | 7/1997 | Cooper et al. | 73/40.7 |
| 6,132,636 A * | 10/2000 | Singh et al. | 252/68 |
| 6,338,255 B1 * | 1/2002 | Richard et al. | 62/292 |
| 6,475,406 B1 * | 11/2002 | Bowers | 252/68 |
| 6,476,120 B1 * | 11/2002 | Bowers | 524/546 |

* cited by examiner

*Primary Examiner*—William C. Doerrler
(74) *Attorney, Agent, or Firm*—Daniel S. Polley, P.A.

(57) ABSTRACT

A composition is disclosed for preventing and repairing leaks, and lubricating gaskets and o-rings, preferably for use in a motor vehicle air conditioning system. The composition preferably includes a fluorocarbon resin mixed a dye. Mineral oil for R-12 refrigerant systems or ester oil for R-134a refrigerant systems can also be added to the mixture. The composition is preferably installed with an air conditioning oil injector through the low pressure side service port of the air conditioning system. When using the product, it is not required to evacuate the air conditioning system. The oil injector containing the composition is connected to the low pressure side service port, the motor vehicle engine is started, the air conditioning system is set to maximum cooling and the system recharged with either R-12 or R-134a refrigerant. The relevant leaks are sealed by composition which also lubricates rubber parts of the air conditioning system.

20 Claims, 1 Drawing Sheet

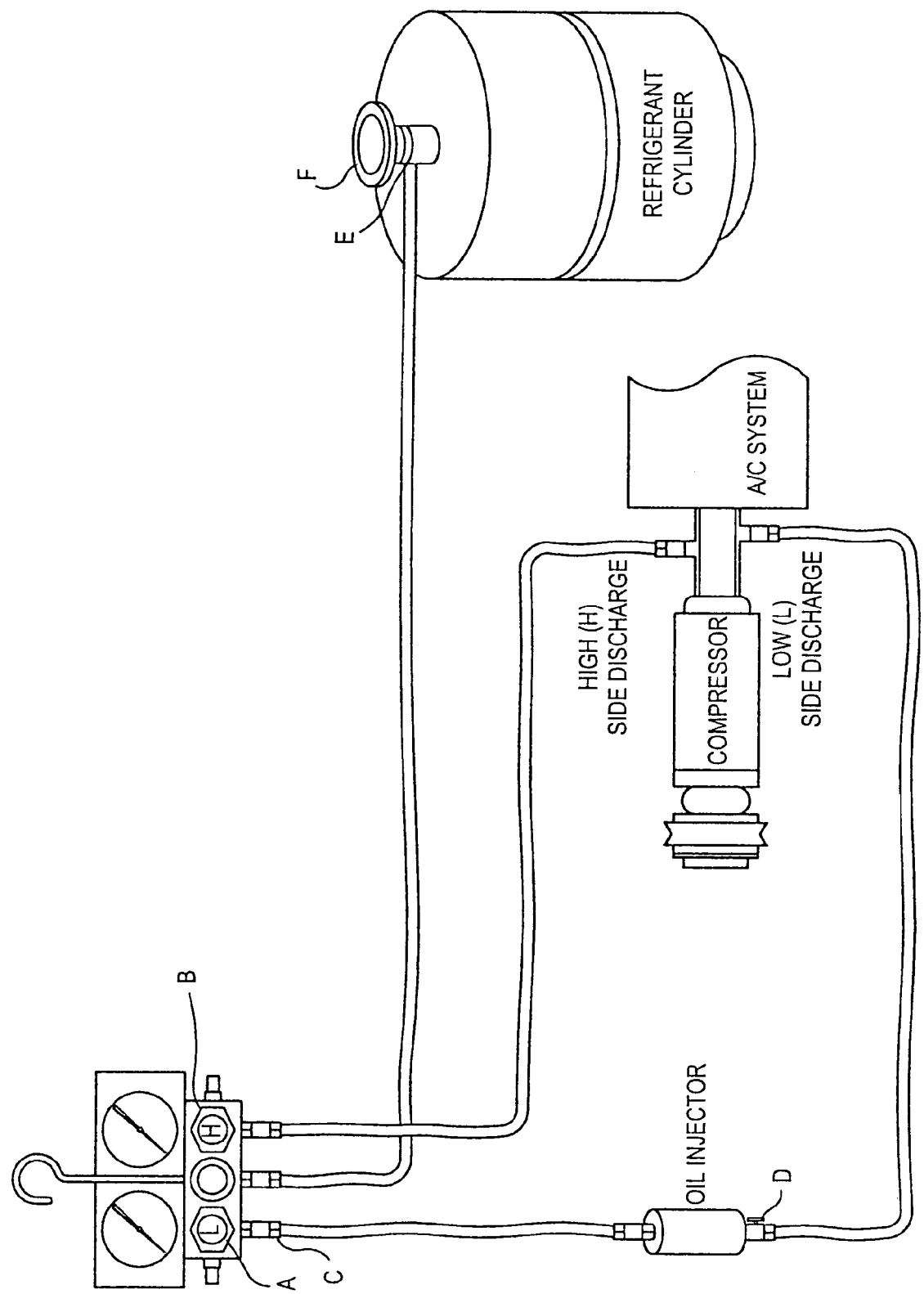

COMPOSITION FOR LEAK STOPPER AND SEALER

This application is a continuation of U.S. application Ser. No. 10/065,649, filed Nov. 6, 2002 now abandoned, which claims priority to and the benefit of U.S. Application No. 60/337,841, filed Nov. 8, 2001, both applications incorporated by reference.

BACKGROUND OF THE INVENTION

1. Field of the Invention

This invention relates generally to leak stoppers and in more particular to an improved composition for stopping, detecting, sealing and/or preventing leaks in air conditioning systems such as those in an automobile.

2. Background of the Invention

Automobile air conditioning systems often begin to leak after periods of extended use. The leaks can occur from a variety of sources. Current products on the market to repair such leaks either do not perform as claimed or are relatively complicated to use. Thus, there exist a need in the art for a leak stopper, detector, sealer and/or preventer for air conditioning systems, such as, but not limited to, those found in vehicles, which effectively performs to repair or prevent leaks in the system and is relatively simple to use. It is to these goals that the present invention is directed.

SUMMARY OF THE INVENTION

Generally, the present invention relates to a composition and method for sealing and lubricating leaks in evaporator and/or condenser connection hoses, gaskets and o-rings of air conditioning systems, such as, but not limited to those found in motor vehicles. The composition preferably includes a fluorocarbon resin, such as, but not limited to, TEFLON™, which can be mixed with a dye, such as a detector dye. A mineral oil for R-12 refrigerant systems or ester oil for R-134a refrigerant systems can also be added to the mixture for diluting the mixture. The composition can be installed with an air conditioning oil injector through the low pressure side service port of the air conditioning system. When using the product, it is not required to evacuate the air conditioning system. Rather, the oil injector containing the composition is connected to the low pressure side service port, the motor vehicle engine is started, the air conditioning system is set to maximum cooling and the system recharged with either R-12 or R-134a refrigerant. Thus, the relevant leaks are sealed by composition which also lubricates rubber parts of the air conditioning system.

Accordingly, it is an object of the present invention to provide a composition for stopping, preventing, sealing, lubricating and/or detecting leaks in air conditioning systems, such as those found in motor vehicles.

It is another object of the present invention to provide a composition for stopping, preventing, sealing, lubricating and/or detecting leaks in evaporator and/or condenser connection hoses, gaskets and o-rings of a motor vehicle air conditioning system.

It is an additional object of the present invention to provide a composition for stopping, preventing, sealing, lubricating and/or detecting leaks in evaporator and/or condenser connection hoses, gaskets and o-rings of a motor vehicle air conditioning system which is relatively simple to use, relatively low in cost and easy to manufacture.

Other objects and advantages of this invention will become apparent from the following description of certain preferred embodiments of this invention.

BRIEF DESCRIPTION OF THE DRAWINGS

The FIGURE illustrates the assembly connection for adding the present invention composition to a charged air conditioning system.

DETAILED DESCRIPTION OF THE PREFERRED EMBODIMENT

The present invention provides a composition for stopping, preventing, sealing, lubricating and/or detecting leaks in air conditioning systems, including evaporator and/or condenser connection hoses, gaskets and o-rings of a motor vehicle air conditioning system. In one embodiment, the composition consist of a fluorocarbon resin, such as, but not limited to, TEFLON™. However, it is preferred to mix the fluorocarbon resin with a dye, such as a detector dye which creates a bond. The detector can be a tracer or fluorescent dye, such as polyol ester.

The full chemical name for the fluorocarbon resin is polytetrafluoroethylene which is a polymer derived from tetrafluoroethylene and abbreviated as PTFE. The fluorocarbon resin, with or without dye, can also be mixed with mineral oil for R-12 refrigerant systems or ester oil for R-134a refrigerant systems which act to dilute the mixture.

The PTFE particles are not limited to any particular one size, and are preferably approximately thirty (30) microns or smaller. In one preferred embodiment the PTFE particles can be approximately four (4) microns or less on the average for the mixture. In another embodiment the PTFE particles can be approximately two (2) microns or less on the average for the mixture.

The fluorocarbon resin, preferably appearing as small particles, can be provided in a carrier oil, such as, but not limited to a petroleum oil. The petroleum oil can be highly refined and solvent neutral. However, as the air conditioning system also contains oils, the fluorocarbon resin can also be provided without a carrier oil. The PTFE can be provided in liquid or powder form prior to mixture.

Though not limiting, the preferred ratio for the composition/formula preferably consist as follows:
 (1) Fluorocarbon resin/PTFE—between approximately eighty to one hundred percent, and all values therebetween;
 (2) Dye—between zero to approximately twenty percent, and all values therebetween;
 (3) Mineral or Ester Oil—between zero to approximately twenty percent, and all values therebetween.

In one embodiment, the preferred composition ratio consist of approximately ninety five percent PTFE and approximately five percent dye. However, as seen be the above ratios, the PTFE can be used solely without any other ingredients and accomplished the objectives of the present invention (i.e. leak sealer/stopper, etc.).

The composition of the present invention is preferably inert until it mixes with the R-12 or R-134a refrigerant which activates the composition causing a chemical reaction. At this point the composition seeks out oxygen entering the air conditioning system through the location of the leak. The composition chemically bonds with the oxygen at the leak location, forming a permanent chemical weld and sealing the leak. If there are no leaks in the air conditioning system, the composition remains in its liquid state continuing to lubricant various internal parts of the air conditioning system, such as, but not limited to rubber gaskets and o-rings.

The composition is preferably used with smaller holes and leaks in the air conditioning system. Larger holes may still need to be manual repaired as is commonly practiced. In one embodiment, the composition is formulated to repair and seal holes in a system that can hold an approximately 5 inch vacuum on the low pressure side of the system for approximately fifteen minutes. However, these thresholds are not considered limiting. The composition also seals leaks (i.e. holes, cracks, gaps, etc.) in condenser and connection hoses, gaskets and o-rings.

In use, the user preferably inspects the air conditioning system for any obvious leak and/or hose ruptures. The air conditioning system low pressure side service port is located and the engine is started and the air conditioning system is set to maximum cooling. The air conditioning oil injector is filled with the present invention composition (preferably approximately two ounces worth, though such is not considered limiting), and the oil injector is connected to the low pressure side service port, while the air conditioning system is being recharged with R-134a or R-12 refrigerant to its appropriate amount, based on the particular motor vehicle (See FIGURE). The air conditioning system is preferably allowed to run for approximately fifteen minutes, though such time period is not considered limiting, to circulate the present invention composition to seal all relevant leaks. The composition is preferably installed through the manifold gauges similar to how air conditioning oil is added. The above situation would occur where the air conditioning system has a slow leak and maintains a partial charge, without having to evacuate the system.

Similarly, when completely recharging the air conditioning system (evacuated system), approximately two ounces of the present invention composition (though such amount is not considered limiting) can be substituted for approximately two ounces of air conditioning system oil, and the above process or method is implemented.

In addition to its leak sealing and prevention characteristics the present invention also provides a coating inside the air conditioning system and helps to soften the o-rings and other rubber parts to help prevent or reduce cracking or breaking of such parts.

In manufacturing the composition and disposing the manufactured composition in small containers/receptacles (i.e. two ounce bottles) for retail sale the following process can be implemented. The various ingredients of the composition are blended or otherwise mixed together in their desired ratio and placed in a relatively large bottle/vessel/container/receptacle, etc. which is then vacuumed to remove all air and moisture. Once vacuumed, the contents is poured, preferably through a filter to remove large particles and other unwanted objects, into the smaller bottles. The manufacturing and/or process of getting the composition contents into small retail bottles can be heated to assure a liquid state for the composition, which aids in composition flow.

The present invention composition is not limited to motor vehicle air conditioning systems and can be used with any system that uses Freon such as home air conditioning systems, refrigerators, freezers, etc. and all are considered within the scope of the invention.

Thus, it is to be understood that while I have illustrated and described certain forms of my invention, it is not to be limited to the specific forms or arrangement of parts or composition herein described and shown. It will be apparent to those skilled in the art that various changes may be made without departing from the scope of the invention and the invention is not to be considered limited to what is shown in the drawings and described in the specification.

What is claimed is:

1. A method for sealing a leak in an air conditioning system comprising introducing internally into the system a composition having a fluorocarbon resin for internal mixture with refrigerant residing within the system, wherein the fluorocarbon resin comprises at eighty percent of the composition.

2. The method for sealing of claim 1 wherein the composition also comprises a dye.

3. The method for sealing of claim 2 wherein the dye is a detector dye.

4. The method for sealing of claim 1 wherein the composition also comprises an oil.

5. The method for sealing of claim 4 wherein the oil is a mineral oil or ester oil.

6. A composition for use in internally sealing a leak in an air conditioning system, comprising:
   a fluorocarbon resin comprising at least eighty percent of the composition; and
   an oil comprising up to twenty percent of the composition;
   wherein the composition is introduced internally within the system and mixes with refrigerant residing in the system.

7. The composition of claim 6 wherein the oil is mineral oil or ester oil.

8. The composition of claim 6 wherein said composition further comprises a dye comprising up to twenty percent of the composition.

9. The composition of claim 8 wherein the dye is a detector dye.

10. A composition for use in sealing a leak in an air conditioning system, comprising:
    a fluorocarbon resin comprising approximately ninety five percent of the composition; and
    an oil;
    wherein the composition mixes with refrigerant residing in the system.

11. A composition for use in sealing a leak in an air conditioning system, comprising:
    a fluorocarbon resin comprising at least eighty percent of the composition; and
    an oil;
    wherein the composition mixes with refrigerant residing in the system;
    wherein the fluorocarbon resin is provided in particle form having an approximate size of four microns or less.

12. A composition for use in sealing a leak in an air conditioning system, comprising:
    a fluorocarbon resin comprising approximately ninety five percent of the composition; and
    a dye;
    wherein the composition is introduced internally within the system and mixes with refrigerant residing in the system.

13. The composition of claim 12 wherein the dye is a detector dye.

14. The composition of claim 12 wherein said composition further comprises an oil.

15. The composition of claim 14 wherein the oil is mineral oil or ester oil.

16. A composition for use in sealing a leak in an air conditioning system, comprising:

a fluorocarbon resin comprising at least eighty percent of the composition; and a dye;

wherein the composition mixes with refrigerant residing in the system;

wherein the fluorocarbon resin is provided in particle form having an approximate size of four microns or less.

17. A method for manufacturing a leak sealant composition comprising the steps of:

(a) blending a composition in a desired ratio with the composition comprising a fluorocarbon resin and at least one of the following; an oil or a dye;

(b) creating a vacuum to remove all air and moisture from the composition; and (c) filtering the composition to remove any large particles.

18. The method of claim 17 further comprising the step of heating the composition to assure a liquid state for the composition to aid in composition flow.

19. The method of claim 17 wherein the fluorocarbon resin comprises at least eighty percent of the composition.

20. The method of claim 17 wherein the fluorocarbon resin comprises approximately ninety percent of the composition.

\* \* \* \* \*